US006854906B2

(12) United States Patent
Mandel

(10) Patent No.: US 6,854,906 B2
(45) Date of Patent: Feb. 15, 2005

(54) ERGONOMIC KEYBOARD TILTED FORWARD WITH DVORAK KEY LAYOUT

(76) Inventor: Yaron Nahum Mandel, 14 Nottinghill Rd., Thornhill, Ontario (CA), L3T 4X9

( * ) Notice: Subject to any disclaimer, the term of this patent is extended or adjusted under 35 U.S.C. 154(b) by 32 days.

(21) Appl. No.: 10/315,212

(22) Filed: Dec. 10, 2002

(65) Prior Publication Data

US 2004/0109716 A1 Jun. 10, 2004

(51) Int. Cl.$^7$ ................................................ B41J 11/44
(52) U.S. Cl. ...................... 400/472; 400/489; 400/100
(58) Field of Search .................................. 400/472, 489

(56) References Cited

U.S. PATENT DOCUMENTS 5,166,669 A * 11/1992 Romberg .................... 345/168
5,426,449 A * 6/1995 Danziger .................... 345/168
5,936,555 A 8/1999 Zagnoev
6,005,496 A 12/1999 Hargreaves
6,467,979 B2 10/2002 Camacho

OTHER PUBLICATIONS

Technical specification of 2001 DQE keyboard from the Dvorty Boards web site.
Technical specification of the Classic Contoured keyboard from the Kinesis Corporation web site.
Technical specification of the Touch Stream ST keyboard from the Finger Works web site.

* cited by examiner

Primary Examiner—Charles H. Nolan, Jr.

(57) ABSTRACT

An ergonomic keyboard having a Dvorak key layout. The keys are arranged in a V or U shape. The keyboard is tilted downward away from the user. The keyboard has a wrist rest, and a switch to change the key layout to QWERTY.

7 Claims, 3 Drawing Sheets

ERGONOMIC KEYBOARD TILTED FORWARD WITH DVORAK KEY LAYOUT

BACKGROUND

1. Field of the Invention

The invention relates to ergonomic keyboards for computers and terminals.

2. Prior Art

In an effort to minimize repetitive strain injuries (RSI) such as carpal tunnel syndrome, keyboard manufacturers have turned their attention to ergonomic keyboards. Several approaches have been used.

One approach involves arranging the keys along a flat V or U shape instead of a straight horizontal line. The keys are arranged either in one continuous group along this shape, or in two groups. The advantage is that the angle of the user's arms is more natural and therefore more relaxed. Sometimes the keyboard also has a wrist rest. For example, see Camacho (U.S. Pat. No. 6,467,979 and others).

Another approach involves the use of the Dvorak key layout (ANSI standard X3.207) instead of the more common QWERTY key layout. The advantage is that the most commonly used keys are located on the home row, which minimizes finger travel and extension. For example, see Zagnoev (U.S. Pat. No. 5,936,555).

Another approach involves placing the keys below the level of the user's palm, or tilted downwards away from the user. This is instead of the usual arrangement where the keyboard is either tilted upwards away from the user, or it is flat on the desk. The advantage is that the user's palm slopes downwards along the surface of the keys, so it continues along the line formed by the user's arm from the shoulder downwards. Therefore the user's palm is more relaxed. For example, see Hargreaves (U.S. Pat. No. 6,005,496 and others).

All these approaches are beneficial. Some of the prior art combines a number of approaches to improve the keyboard. It would be best to combine all of these approaches.

SUMMARY

This invention combines the three approaches described in the prior art section to create an ergonomic keyboard. The keyboard has a Dvorak key layout. It is tilted downwards away from the user. The keys are arranged in a V or U shape. It has a wrist rest. The result is a superior ergonomic keyboard that helps minimize repetitive strain injuries.

DRAWING FIGURES

Figure 1:
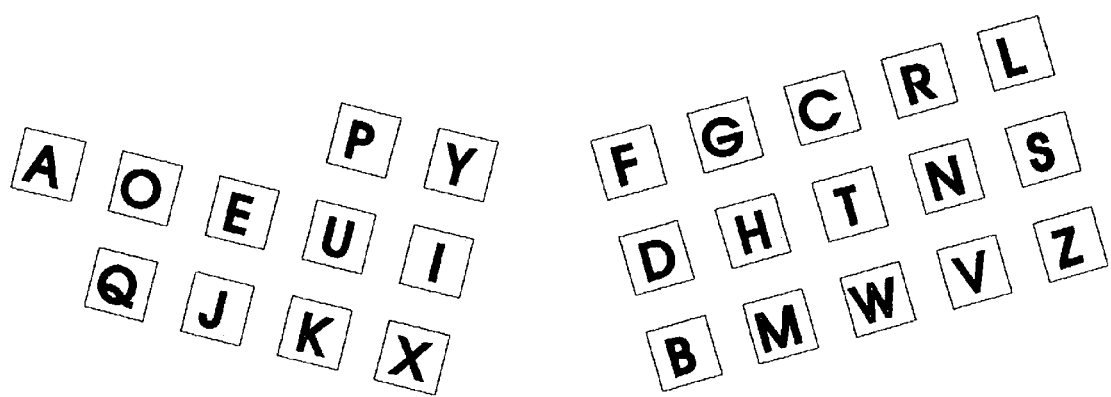

FIG. 1: The keyboard with the character keys arranged in 2 groups in a V shape.

Figure 2:
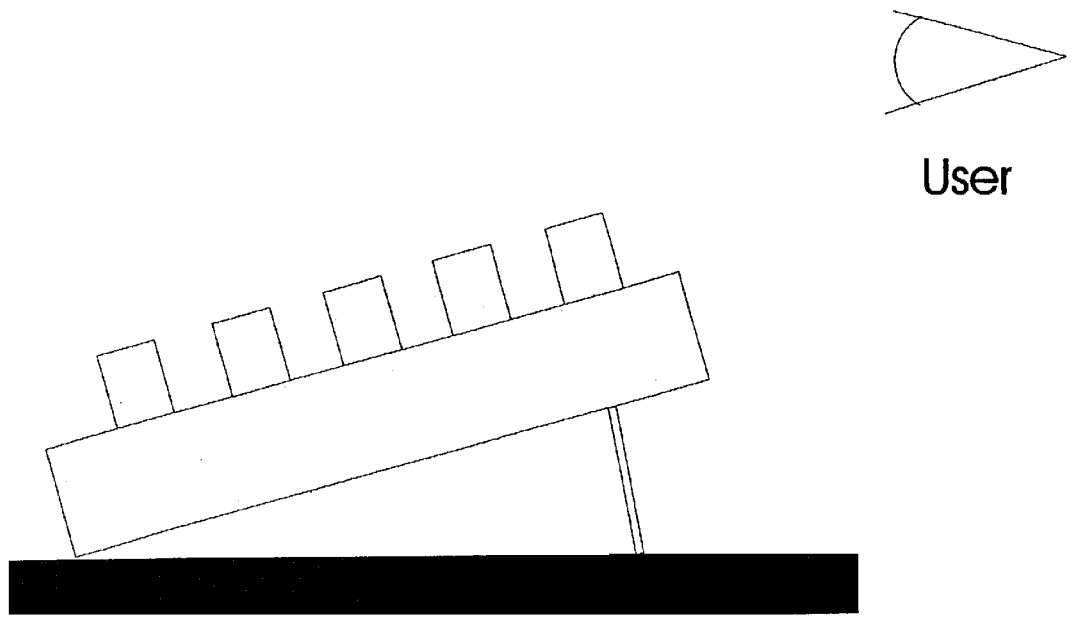

FIG. 2: Side view of the keyboard without a wrist rest.

Figure 3:
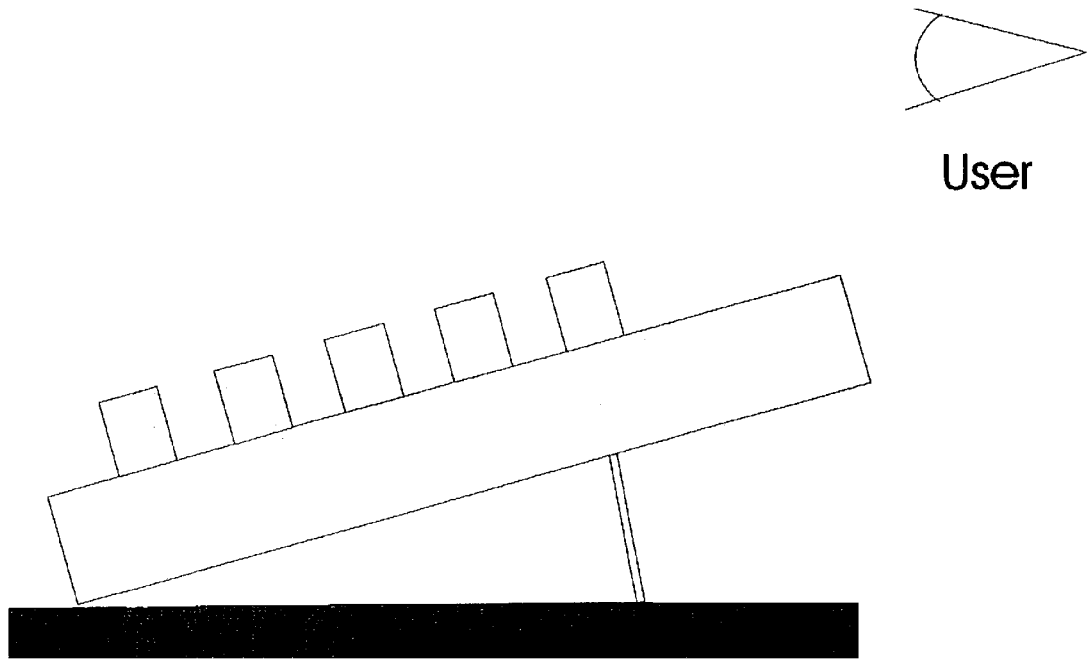

FIG. 3: Side view of the keyboard with a wrist rest.

Figure 4:
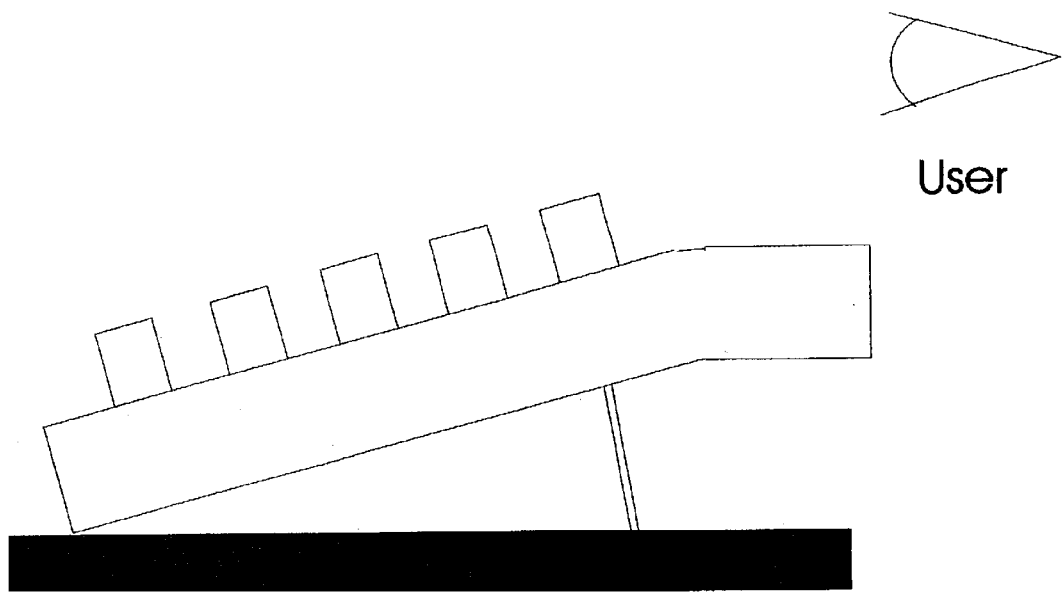

FIG. 4: Side view of the keyboard with a different kind of wrist rest.

Figure 5:
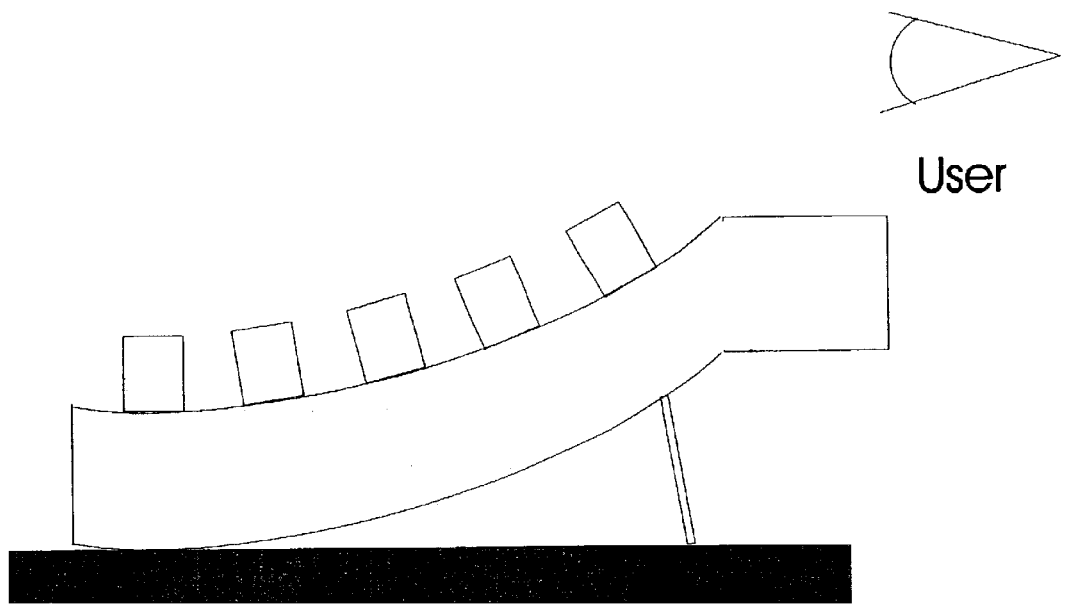

FIG. 5: Side view of the keyboard with a concave profile and with a wrist rest.

DETAILED DESCRIPTION

This keyboard combines a number of ergonomic features.

The keyboard uses the Dvorak key layout instead of the usual QWERTY. The keys are arranged in a V or U shape. FIG. 1 shows the character keys arranged in two groups to form a V shape. The keys can also be arranged in one group and in a U shape.

The Dvorak key layout can be split in two groups using the groups as shown in FIG. 1, or split in two different groups. Only character keys are shown. Other keys such as numeric, punctuation, arrow and function keys are not shown. Placement of these keys will vary in different implementations. The implementations do not necessarily adhere to ANSI standard X3.207.

The preferred embodiment of the keyboard has character keys in the layout shown in FIG. 1. FIG. 1 shows the keys arranged in straight rows and columns. This is not necessarily the case. In most implementations the columns will not be vertical as shown. For example, S will not generally be straight above Z, and E will not be exactly above J.

The keyboard is tilted downward away from the user. See FIG. 2. This is different from the usual keyboard which is either flat on the desk, or is tilted upward away from the user.

The keyboard has a wrist rest. FIG. 3 and FIG. 4 show two different wrist rests. Other positions for the wrist rest are also possible. For example, a horizontal wrist rest such as the one in FIG. 4 can be used, but it can be located higher, at a longer distance from the keys. The preferred embodiment has a horizontal wrist rest generally as shown in FIG. 4, but it can be located higher, at a longer distance from the keys.

The keyboard can be curved: concave or convex. FIG. 5 is a concave keyboard with a wrist rest.

The keyboard has a switch that changes the key configuration from Dvorak to QWERTY.

The foregoing description of the preferred embodiment of the invention and some possible variations has been presented for the purposes of illustration and description. It is not intended to be exhaustive or to limit the invention to the precise form disclosed. Many modifications and variations are possible. It is intended that the scope of the invention be limited not by this detailed description, but rather by the claims appended hereto.

I claim:

1. An ergonomic keyboard comprising
   an upper row of characters comprising from left to right P Y F G C R L,
   a middle row of characters comprising from left to right A E U I D H T N S,
   and a lower row of characters comprising from left to right Q J K X B M W V Z;
   said keyboard further comprising numeric keys and other non-character keys;
   said keyboard is tilted downward away from the user.

2. The keyboard in claim 1, wherein said rows of characters lie along an imaginary V or U shape.

3. The keyboard in claim 1, wherein said rows of characters are split into two groups lying along the two sides of an imaginary V or U shape,
   the left side of said upper row comprising from left to right P Y,
   the right side of said upper row comprising from left to right F G C R L,
   the left side of said middle row comprising from left to right A O E U I,
   the right side of said middle row comprising from left to right D H T N S,
   the left side of said lower row comprising from left to right Q J K X, and
   the right side of said lower row comprising from left to right B M W V Z.

4. The keyboard in claim 1, wherein said keyboard further comprising a wrist rest.

5. The keyboard in claim 1, wherein the profile of said keyboard is concave.

6. The keyboard in claim 1, wherein the profile of said keyboard is convex.

7. The keyboard in claim 1, wherein said keyboard further comprising a switch changing the key configuration to QWERTY.

* * * * *

UNITED STATES PATENT AND TRADEMARK OFFICE
CERTIFICATE OF CORRECTION

PATENT NO. : 6,854,906 B2
DATED : February 15, 2005
INVENTOR(S) : Yaron Nahum Mandel It is certified that error appears in the above-identified patent and that said Letters Patent is hereby corrected as shown below:

<u>Column 2,</u>
Line 40, insert:
1. An ergonomic keyboard comprising
an upper row of characters comprising from left to right P Y F G C R L,
a middle row of characters comprising from left to right A O E U I D H T N S,
and a lower row of characters comprising from left to right Q J K X B M W V Z;
said keyboard further comprising other keys;
said keyboard is tilted forward, downward, away from the user's hands.

Signed and Sealed this

Sixth Day of June, 2006

JON W. DUDAS
*Director of the United States Patent and Trademark Office*